(No Model.) 2 Sheets—Sheet 1.
H. McPHERSON.
HORSE HAY RAKE.
No. 353,799. Patented Dec. 7, 1886.
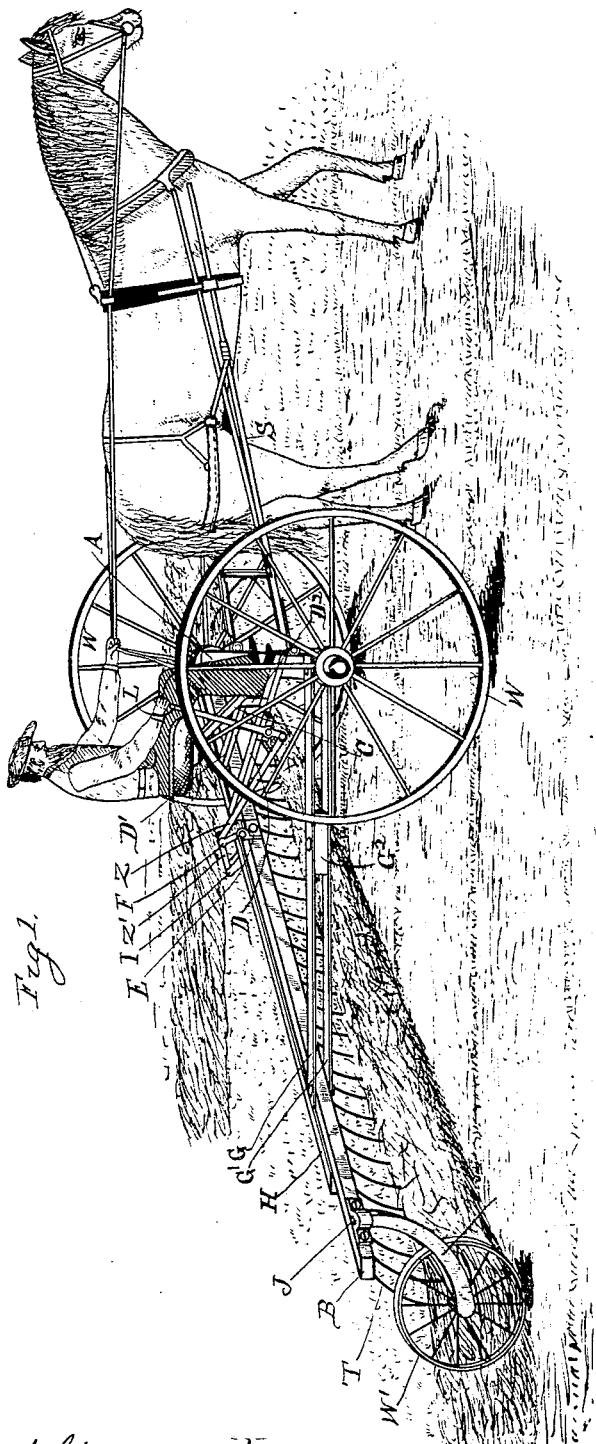

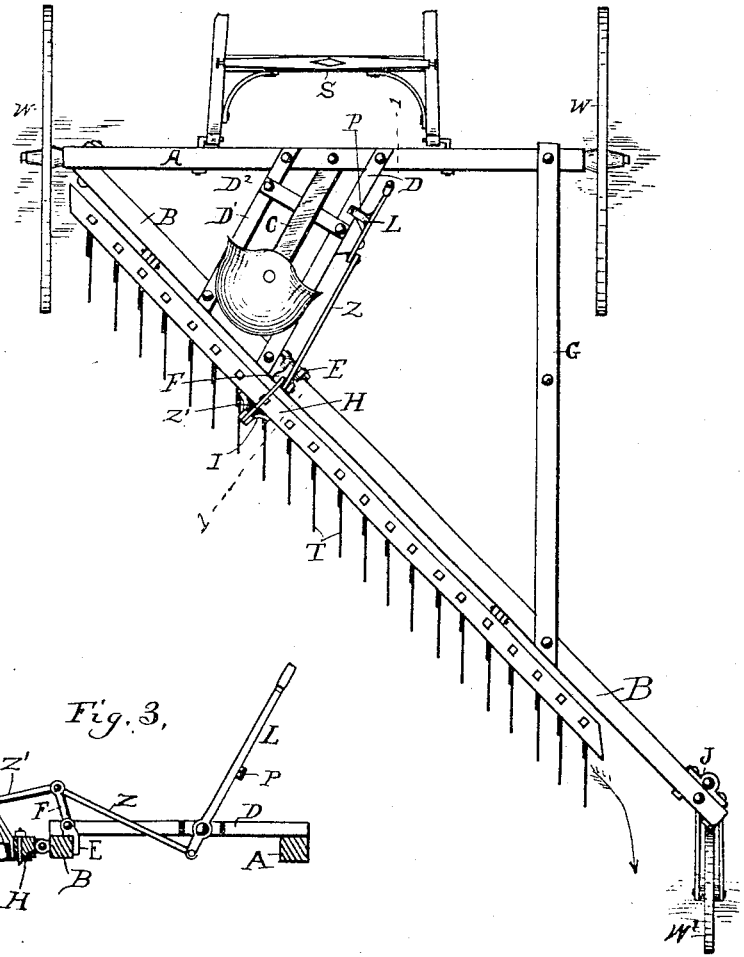

United States Patent Office.

HORACE McPHERSON, OF CRETE, ILLINOIS.

HORSE HAY-RAKE.

SPECIFICATION forming part of Letters Patent No. 353,799, dated December 7, 1886.

Application filed July 10, 1886. Serial No. 207,712. (No model.)

*To all whom it may concern:*

Be it known that I, HORACE MCPHERSON, a citizen of the United States of America, residing at Crete, in the county of Will and State of Illinois, have invented certain new and useful Improvements in Horse Hay-Rakes, of which the following is a specification, reference being had therein to the accompanying drawings.

This invention relates to certain improvements in horse hay-rakes designed to rake hay into a continuous windrow, which improvements are fully set forth and explained in the following specification and claims, and the letters and figures of reference thereon, and forming a part of the specification, in which—

Figure 1 is a perspective view of the horse hay-rake as it would appear in operation raking hay in a continuous windrow in the field. Fig. 2 is a top plan view of the horse hay-rake. Fig. 3 is a cross-sectional view of the rake on dotted lines 1 1 of Fig. 2, to more clearly show the lever and its connecting parts for raising or holding depressed the rake-teeth.

Referring to the drawings, A is the axle of the rake, supported by a pair of traveling wheels, W W. S is a pair of thills hinged thereto.

B is a rake-head beam, to which the rake-head attaches, and is arranged to stand obliquely to and at an angle of about forty-five degrees with the axle A, as shown in Fig. 2. The front end of said beam is rigidly secured to the rear side of said axle, at one end thereof, by means of a bolt, and the rear diverging end is connected with said axle by means of the tie-braces G G', bolted thereto, as shown in Figs. 1 and 2, to maintain the said beam B at the proper angle with axle A. $G^2$ is a block, secured centrally between said braces to strengthen them.

H is the rake-head, secured to the rear side of beam B by means of hinges, as shown in Fig. 2; and T are the rake-teeth, secured to said rake-head.

D D' are braces for connecting the axle A and beam B, and, in connection with cross-brace $D^2$, support the seat-standard c.

I is a standard-box secured to the rake-head, and F is a rock-arm pivoted at its lower end in standard-box E to the beam B, as shown in Fig. 3. The upper ends of said standard-box and rock-arm are pivotally connected by means of the link Z'.

L is a lever fulcrumed a short distance above its lower end to the side of brace D, near the driver's seat, and its lower end is pivotally connected with the upper end of rock-arm F by means of the link Z. The operator can elevate or lower the rake-teeth by means of the lever L, through the medium of its said connections with the rake-head, when desired, it being only necessary to elevate the rake-teeth when the rake is being turned. A better leverage is gained on the rake-head by means of the use of the rock-arm F and link Z' than if link Z connected lever L directly with standard-box I.

W' is a caster-wheel, attached to the rear extending end of the beam B by means of the caster-box J, and is for the purpose of supporting that end of said beam and rake-head and for permitting the rake to be easily turned around.

The frame, consisting of beam B, braces G G', and axle A, is triangular in form, and as the rake-head is secured to said beam it is necessarily at an angle or oblique to the axle, so that in operation the hay will be raked to one side and left in a continuous windrow, as shown in Fig. 1. The rake is shown in said figure as raking two swaths as left by a mower upon the third swath to form the continuous windrow thereon. Should the hay adhere to the teeth, it can be loosened and shaken off by bearing forward on lever L, causing the teeth T to engage with the earth and spring back and forth, thus disengaging the hay, so it will pass to one side to the windrow. As the hay passes along the rake and is rolled along thereby it gains bulk as it nears the extending end of the rake, and the accumulated hay of the windrow, adhering with that on the rake, will assist in causing the hay to leave the rake.

P represents a foot-rest or extending side bracket formed on the hand-lever L, above its point of fulcrum and on its side next the driver's seat, and is for the purpose of forming a means for holding down the rake-teeth T by pressing thereon with the foot, which the driver may do, and thus have both hands free to manage his team or for other purposes.

When desired, the thills S, which are hinged to the axle A, may be removed and a pole substituted in their place, and two horses used to draw the rake in the place of one.

Having thus described my invention, what I claim as new, and desire to secure by Letters Patent, is as follows, to wit:

1. In a horse hay-rake, a triangular frame formed from the axle A, braces G G, and rake-head beam B, arranged, as shown, in combination with the traveling wheels W W, caster-wheel W', rake-head H, having rake-teeth T and hinged to beam B, standard-box I, standard-box E, rock-arm F, links Z and Z', lever L, and the braces and standard, substantially as described, for supporting a driver's seat, as and for the purpose set forth.

2. In the horse hay-rake shown and described, the frame thereof, consisting of the axle A, beam B, and braces G G', arranged to be triangular in form, in combination with the rake-head H, having the teeth secured thereto, substantially as set forth, and hinged to the oblique side beam of said frame, traveling wheels W W, supporting the axle A of said frame, and caster-wheel W', supporting the rear extending end of beam B of said frame, in the manner and for the purpose specified.

3. The horse hay-rake shown and described, consisting of the combination of the axle A, supported by the traveling wheels W W, the rake-head beam B, secured to the rear side of said axle and arranged obliquely therewith, the braces G G, connecting the outer end of said beam with said axle, the caster-wheel W', supporting the outer end of said beam, the rake-head H, having rake-teeth T and hinged to beam B, and the means, substantially as set forth, for elevating and lowering said rake-teeth from the ground, as and for the purpose specified.

HORACE McPHERSON.

Witnesses:
 THOS. H. HUTCHINS,
 WM. J. HUTCHINS.